Oct. 6, 1970     L. D. CHRONISTER     3,532,578
BEAD COVERING MACHINE

Filed Sept. 12, 1966     6 Sheets-Sheet 1

INVENTOR
LOUIS D. CHRONISTER
BY *Kerrin Palmer, Stewart & Estabrook*
ATTORNEYS

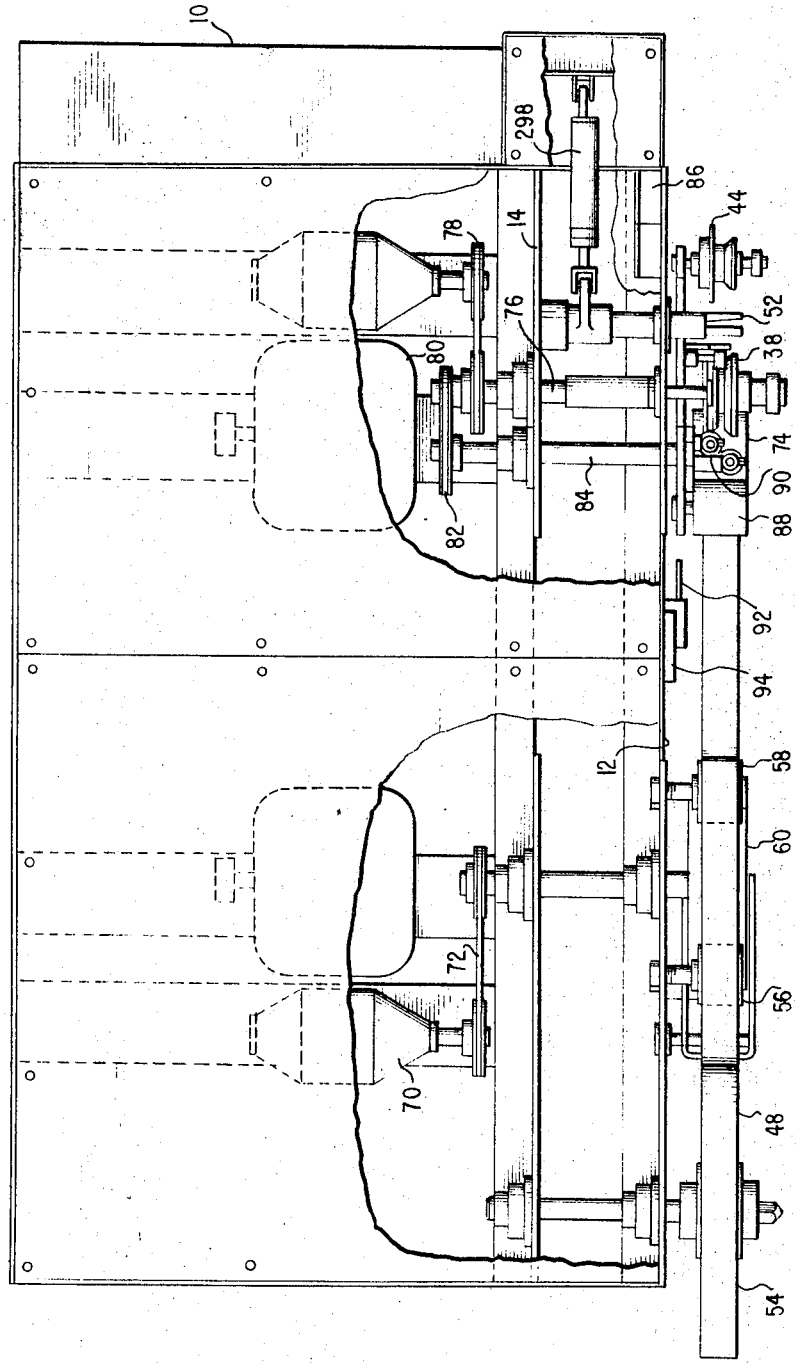

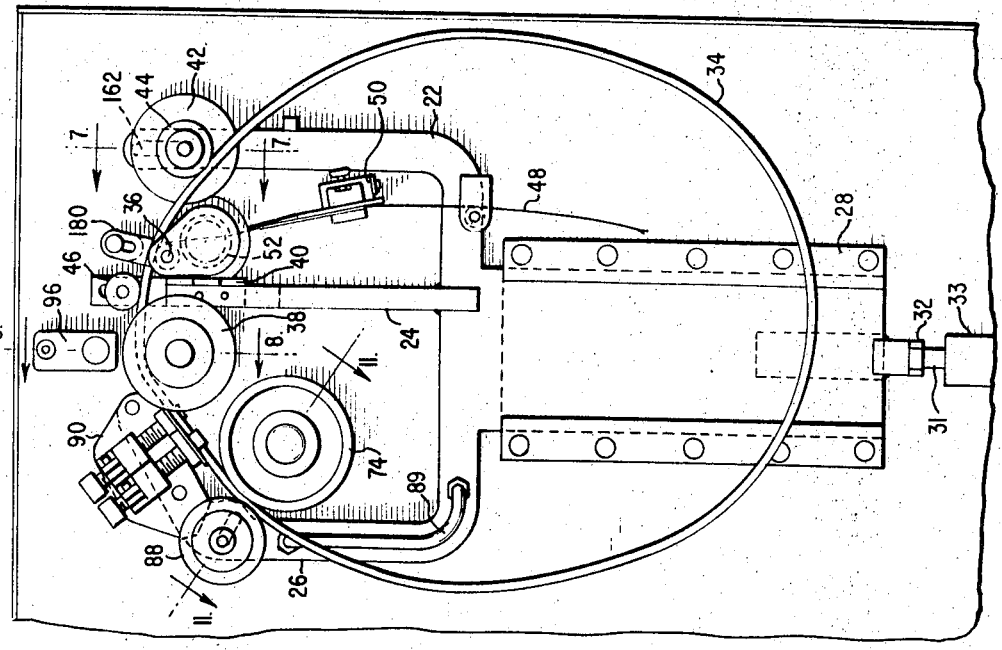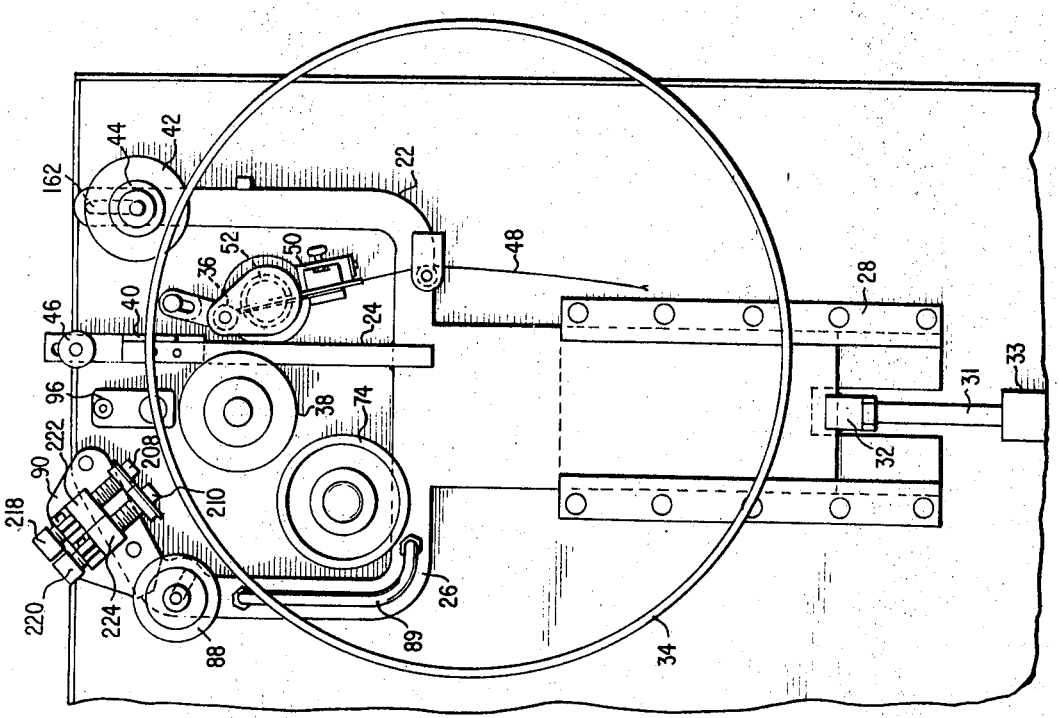

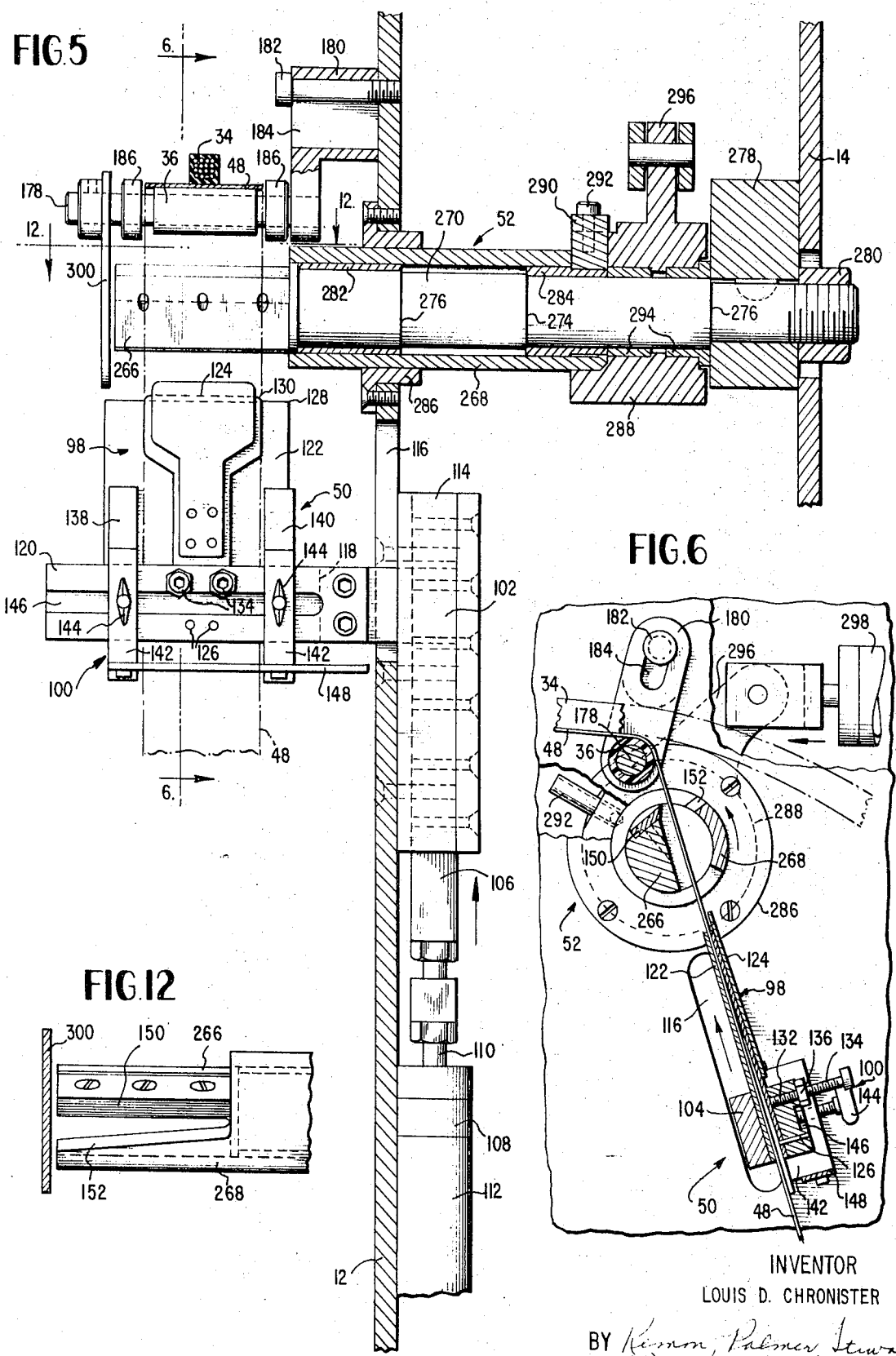

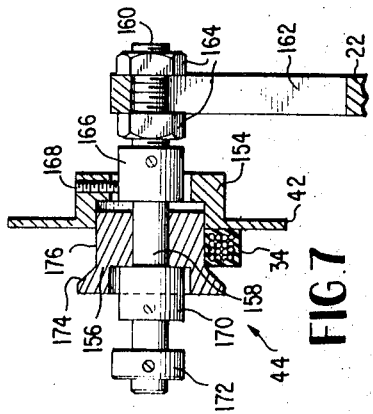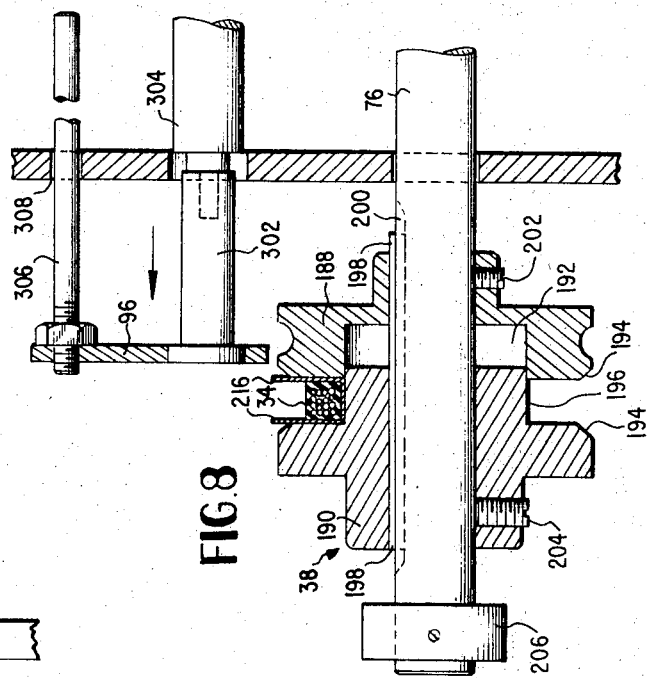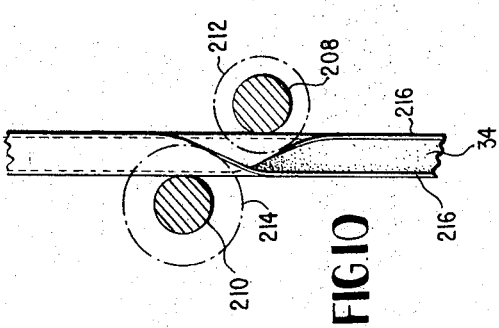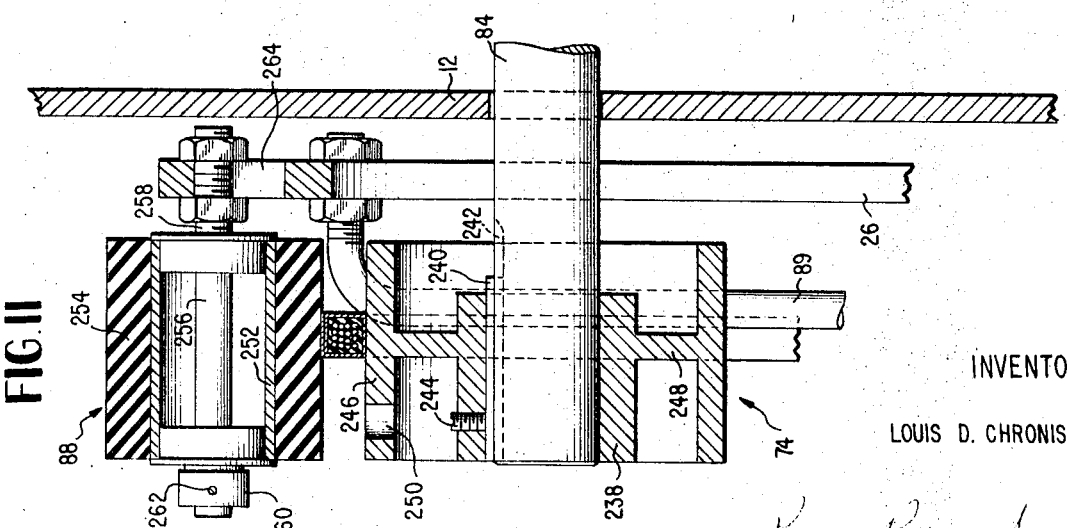

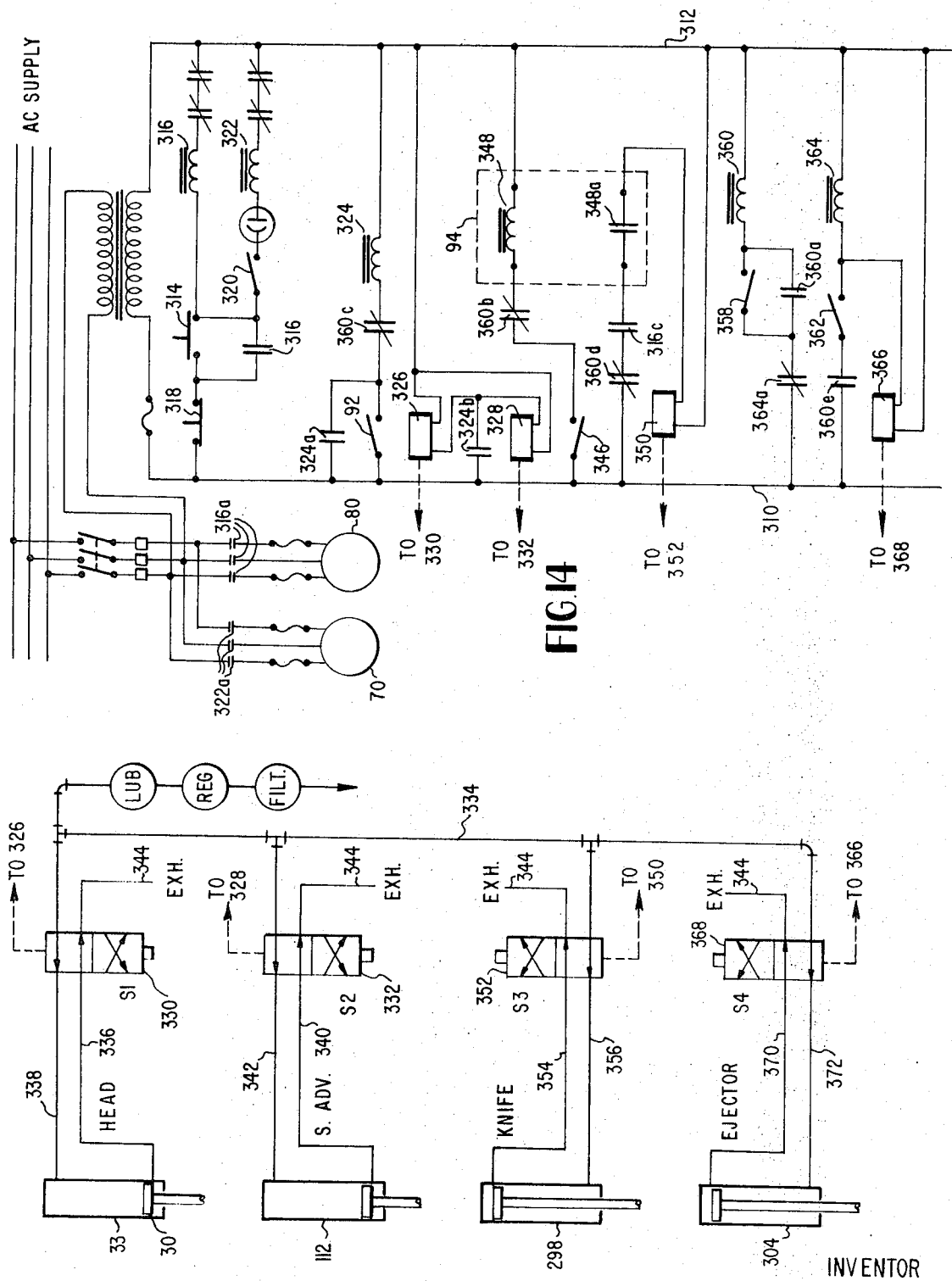

United States Patent Office 3,532,578
Patented Oct. 6, 1970

3,532,578
BEAD COVERING MACHINE
Louis D. Chronister, Uniontown, Ohio, assignor to The General Tire and Rubber Company, Akron, Ohio, a corporation of Ohio
Filed Sept. 12, 1966, Ser. No. 578,700
Int. Cl. B29h *17/34*
U.S. Cl. 156—422                         14 Claims

ABSTRACT OF THE DISCLOSURE

A machine for automatically wrapping a tire bead bundle with covering material includes an automatic covering tape supply apparatus including a tape sensor circuit for supplying covering material to a powered tape advancing assembly. The tape advancing assembly automatically supplies the correct amount of covering material to a bead engaging and wrapping assembly. The last named assembly includes an adjustable, turn-up wheel for wrapping and sealing the tape around three sides of the bead, and it includes a set of adjustable, stepped plow wheels for closing and stitching the tape on the remaining side of the bead. An automatically operated cutting means is disclosed and an automatically operated bead ejecting mechanism is disclosed. Further, the foregoing named assemblies and means are automatically controlled for operation by an adjustable timing means forming a part of a control circuit such that the machine can easily be accommodated to beads of various sizes.

---

This invention relates to a new and improved machine for automatically applying covering material to a bead bundle such as is used in the manufacture of tires, and for wrapping and sealing said material around and to said bead bundle. The machine is adaptable to the application of covering material to any annular-shaped article.

Generally speaking, all bead covering machines utilize a plurality of rollers for urging the bead bundle into a turn-up wheel or the like wherein the covering material is normally wrapped around a portion of the bead bundle. Additional rollers are required to complete the folding or wrapping operation and to stitch the material to the bead. Other rollers are used to rotatably drive the bead during the covering or wrapping operation.

The prior art, such as is represented by the U.S. patents to Jeannero et al., No. 2,855,976 and Breth, No. 2,039,627, has produced a number of machines which are utilized for the specific purpose of wrapping a bead wire bundle, the bundle to be used in a pneumatic tire and the like, with covering materials of various kinds; for example, the machine may be utilized to wrap the bundle with a square woven cloth of tape-like material which resembles friction tape in appearance and feel. The hereinafter to be described embodiment of the bead covering machine of this invention utilizes the described covering tape but other types may be employed depending entirely on the job to be performed.

The bead wrapping machines as represented by the prior art have proved to be inefficient for the purpose of wrapping covering material around and sealing same to bead bundles of different sizes in that they are generally usable only with beads of a given size. This inefficiency results from the complex assemblies of rollers, drive apparatus and covering material supply apparatus that constitute the structure of the prior art machines.

These machines have not been readily adaptable to beads of various diameters in that all of the roller assemblies used are normally mounted in a fixed unadjustable spaced relationship to a fixed position, which position is normally that of a continuously driven turn-up wheel. Apparatus of this type is taught by the patent to Breth, supra. In order to adapt the described machines to cover tire beads having differing diameters and widths, it is necessary to disassemble the entire machine and reassemble the parts in a different spaced-apart relationship relative to each other. Consequently, machines of this type are usually employed to wrap a single sized bead and this consequently necessitates the utilization of a plurality of machines, each adapted to handle beads of different sizes or diameters. It also follows that machines of the type described require a large spare parts inventory, and in addition are difficult to repair as well as operate. Finally, as regards this type of apparatus, it necessarily follows that excessive floor space is required to handle the large number of machines used or if a lesser number of machines are used then a substantial number of man hours are lost in tearing down and rebuilding the machines to accommodate them to larger or smaller beads.

The patent to Jeannero, supra, purports to disclose and describe automatic or semi-automatic apparatus to be utilized for the purpose of wrapping a bead with a length of tape. The construction revealed in the drawings and specification of the noted patent indicates that the apparatus may handle beads of varying diameters but in order to do so it is necessary that a variable speed drive be utilized to rotate a pulley in combination with a sliding adjustment for a guide roller. Machines of this type, although adaptable for beads of various diameters, still require a complex mechanical adjustment of the various sub-assemblies of the machine for the purpose of altering the machine to cover beads of different sizes. These prior art devices, including the Jeannero apparatus, are not completely automatic in function and cannot easily be adapted to handle beads of various diameters and widths. Thus although the Jeannero apparatus can handle various sized beads, with respect to diameter variations, it requires a variable speed drive for this purpose with the attendant problems of inaccuracy and complexity inherent in such devices. For example, speed variation can be critical, causing a bead to be covered with either too much or too little tape. In addition, the various rollers of Jeannero are fixed in position, thus requiring maximum speed control over the machine to accomplish its stated purpose.

Finally, all of the machines disclosed by the prior art do not provide means which are truly automatic in their function in that the prior art machines do not incorporate devices for automatically sensing the covering material and driving the supply mechanisms of the machine in accordance with signals produced through the sensing of the material itself. In addition, none of the prior art devices disclose means for automatically feeding the tape to the bead and to the bead wrapping and sealing rollers, etc., in a timed relationship to the other operations being performed by the machine. Nor does the prior art disclose apparatus that operates automatically in a timed sequential manner to sever lengths of tape, which lengths of tape are cut automatically, the control being by the machine to thereby apply the correct length of tape to any particular sized bead without requiring complex mechanical adjustments to the machine.

Accordingly, it is the primary object of this invention to provide a new, useful and efficient machine for automatically wrapping bead wire bundles of dissimilar sizes and the like with covering materials.

It is another object of this invention to provide a new, efficient machine for automatically wrapping a bead bundle with covering material, said machine including apparatus for automatically engaging said bead bundle with said material, and for wrapping and sealing said material about said bead bundle; for automatically supplying the correct length of covering material for any given size of bead bundle to said bead bundle; for automatically ejecting a covered bead bundle from said machine; and for automatically controlling in a predetermined time sequence the named operations.

It is an object of this invention to provide a new and improved automatic bead wire bundle wrapping machine that can be controlled to automatically cover bead wire bundles of various diameters and widths and eject same after the wrapping thereof.

It is another object of this invention to provide a new and improved covering material supply assembly for automatically supplying covering material to a tire bead wrapping station on a bead wire bundle wrapping machine.

It is an additional object of this invention to provide a new and improved assembly for automatically bringing a bead bundle into contact with covering material, and having roller assemblies for driving the bundle and for wrapping the bead bundle with the covering material.

It is a further object of this invention to provide novel covering material advance means at the wrapping station of an automatic bead bundle wrapping machine, which means is operated automatically by machine control apparatus.

It is an additional object of this invention to provide a novel cutting assembly for an automatic bead bundle covering machine, said assembly being operable in accordance with a machine control to cut the correct length of covering material required for any given size of bead bundle.

It is another object of this invention to provide new and novel roller assemblies to be utilized in an automatic bead bundle covering machine for applying covering material to said bead, for wrapping and sealing said material around said bead, and for rotating said bead and material.

It is a further object of this invention to provide new and novel electropneumatic control means for automatically and sequentially controlling the operation of a plurality of sub-assemblies on an automatic bead wrapping machine in and according to a predetermined timed sequence.

The above-noted objects and other will become clear upon a reading of the hereinafter to be described specific embodiment of the apparatus of the present invention taken in conjunction with the drawings in which:

FIG. 2 is a plan view of the machine of FIG. 1 with sections broken away;

FIG. 3 is a detailed view of the bead wrapping apparatus showing a bead in a bead guiding and rest position prior to a wrapping operation;

FIG. 4 is a detailed view of the apparatus of FIG. 1 and shows a bead positioned so as to be wrapped with covering material;

FIG. 5 is a side detail view with portions showing in section, showing a tape pull through wheel, cutting assembly, and covering material advance assembly;

FIG. 6 is a sectional view taken on the line 6—6 of FIG. 5 and shows the apparatus thereof in front elevation with portions broken away;

FIG. 7 is a side sectional view taken along the line 7—7 of FIG. 4 and shows the hold-down wheel of this invention;

FIG. 8 is a sectional view taken on the line 8—8 of FIG. 4 showing a turn-up wheel and the ejection apparatus of the present invention;

FIG. 9 is a detailed view of a pair of adjustably mounted spaced apart plow wheel used for wrapping and sealing covering material about a tire bead;

FIG. 10 is a plan sectional view taken on the line 10—10 of FIG. 9 showing the plow wheels of FIG. 9 being used to wrap and seal covering material on and to a bead bundle;

FIG. 11 is a sectional view taken on the line 11—11 of FIG. 4 and shows the drive engaging wheel and a powered wheel for rotatably driving a bead bundle made in accordance with this invention;

FIG. 12 is a sectional detailed view of the cutting blades of a knife assembly of the present invention taken on the line 12—12 of FIG. 5;

FIG. 13 is a schematic diagram of the pneumatic apparatus and control valves to be used with the present invention; and FIG. 14 is a wiring diagram showing the electrical circuits utilized for automatically controlling the operations of the bead wrapping machine of the present invention.

Figure 1:
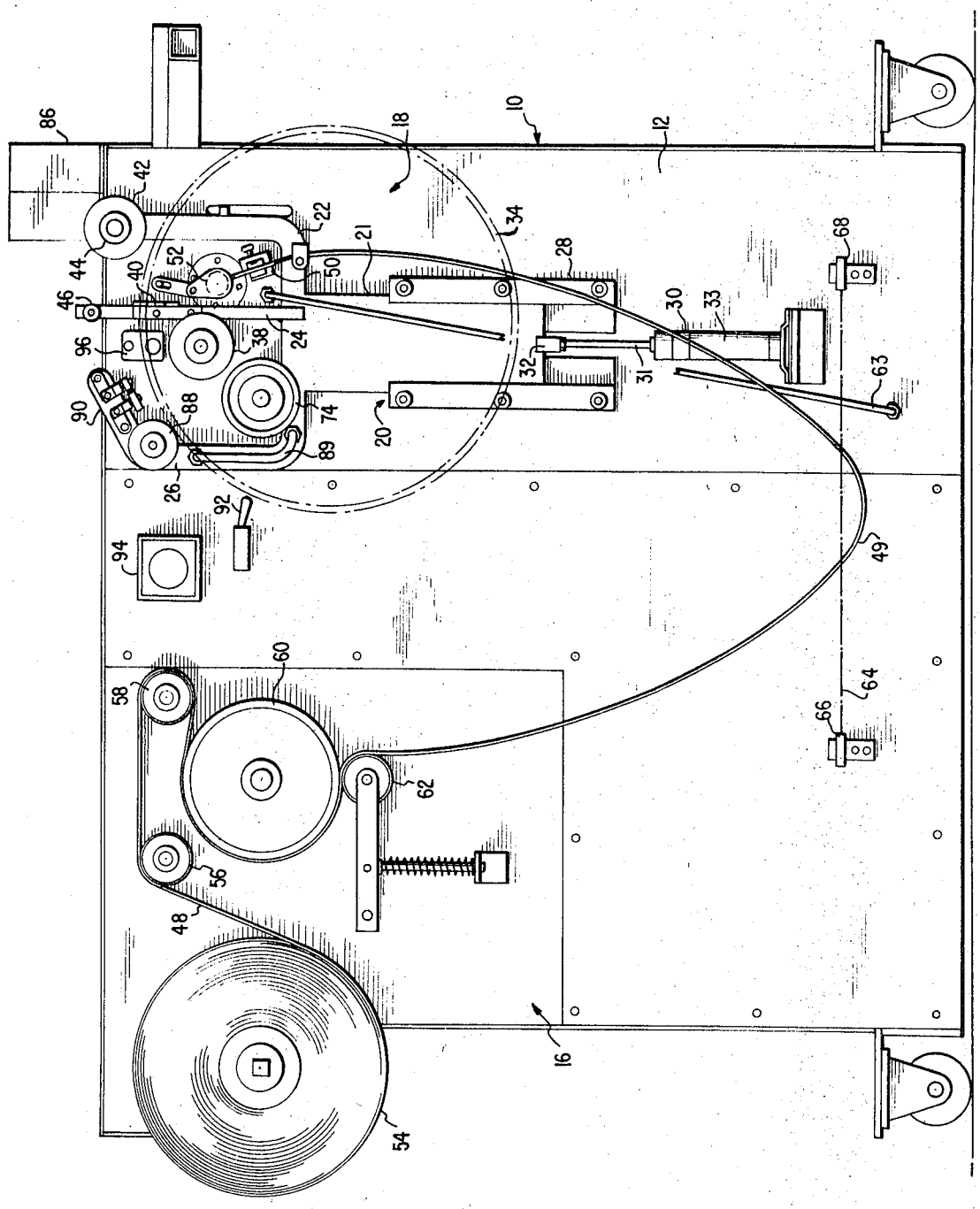
FIG. 1 is a front elevational view of a bead covering machine made in accordance with this teaching.

A specific embodiment of the bead covering machine of the present invention is shown in FIGS. 1 and 2 of the drawings wherein the various elements for wrapping and sealing covering material which will hereinafter be referred to as tape, about a bead wire bundle, which will hereinafter be referred to as the bead, are shown supported on a frame 10 of generally rectangular configuration in elevation, which frame may be mounted on castors or other appropriate wheels for the purpose of facilitating its movement. The tape and elements utilized for the purpose of advancing it, and the rollers and other apparatus utilized for applying the tape to a bead and wrapping same therearound are mounted on and supported by a front wall 12 of the machine 10. As shown in FIG. 2 of the drawings, a partition wall 14 is mounted parallel to and spaced apart from the wall 12. The partition wall is supported within the frame 10 and is used as an additional supporting structure for the machine elements. The structure above enumerated constitutes the supporting structure for the various elements of the machine and is utilized for the specific purpose of supporting a tape supply station 16 and a bead wrapping and sealing station 18 in spaced apart relationship to each other.

The wrapping and sealing apparatus of the machine that constitutes this invention will be described with respect to FIGS. 1 through 4 wherein FIGS. 3 and 4 show the bead wrapping and sealing station 18 of the machine in detail. A head 20 comprising a plate member 21 having three vertically extending arms 22, 24 and 26 with rollers, etc. mounted thereon is supported for vertical reciprocating motion within a plate guide 28 by a piston 30 having a piston rod 31 rigidly attached to one end of the plate 21 as by being threadably received in a lifter 32. The piston is mounted for reciprocating motion within a hydraulic cylinder 33 supported on the front wall 12. The head assembly is mounted to be reciprocated between an upper guiding or bead rest position as shown in FIG. 3, and a lower wrapping or bead covering position as shown in FIG. 4.

The head assembly 20 is maintained at the bead rest position when a bead 34, which bead may be square in cross section, is to be positioned relative to a tape pull through wheel 36 and a turn-up wheel 38, or, that is, prior to a wrapping operation. When the assembly is in this position the bead 34 is placed upon a bead rest plate 40 which plate is mounted on the vertical arm 24 of the plate 21. The bead 34 is also positioned relative to the tape pull through wheel 36 and turn-up wheel 38 by an annular flange 42 on a hold-down wheel 44.

As shown in FIG. 4 of the drawings, when the piston 31 is reciprocated to the bead covering position, the head assembly 20 moves vertically downward in the plate guide 28. A portion of the bead 34 is forced down into the turn-up wheel 38 by a roller member 46 which member will be hereinafter referred to as the pressure roller. The pressure roller 46 is rotatably mounted on the leg 24 of the plate 21 and is brought into engagement with the bead when the plate is reciprocated from the bead rest to the bead covering position. Similarly, the hold-down roller 44 engages another portion of the bead 34 when the plate 21 is reciprocated to the bead covering position, to urge the bead into contact with the tape pull through wheel 36. In this manner, the bead is brought into engagement with tape 48 which covering material is applied to the bottom surface of the bead and adheres thereto through the nature of the tacky substance utilized on the tape. The tape is supplied from the station 16, and is pulled through a tape advance assembly 50 and a cutting assembly 52 as the bead is rotatably driven in a counterclockwise direction.

The material, used for covering the bead, is stripped from a supply roll 54 which roll is rotatably supported by the front wall of the machine. As shown in FIG. 1, the tape 48 is threaded over a pair of idler rollers 56 and 58, which rollers are rotatably mounted on and supported by the front wall 12 of the machine 10, and it is passed around a powered wheel 60 and is urged there against by a spring loaded idler roller 62. The particular construction shown in FIG. 1 of the drawings is utilized to form a loop 49 of tape material between the powered wheel 60 and the tape advance assembly 50. In order to prevent the tape 48 from becoming entangled with the head assembly 20 a tape guide member 63 is supported by the wall 12 forward of the head assembly such that it extends transversely thereacross. In the preferred embodiment the loop of covering tape is made large enough so as to normally interrupt a light beam 64 generated by a conventional source 66. In the absence of the loop of stock material the light beam 64 impinges on a photo transducer 68, which transducer may be a conventional photocell, to thereby cause the phototransducer to generate an output signal. Obviously, the photocell 68 will produce an output signal whenever the loop of the stock material 48 is not sufficiently large enough to interrupt the light beam 64.

The photocell 68 is connected in a circuit, which circuit will be described hereinafter, for the purpose of energizing an electrical motor 70 whenever the loop of stock material becomes so short as to allow the beam of light 64 to impinge upon the photocell. The motor 70 is connected by a conventional pulley arrangement 72 to supply torque to the drive shaft of the driven roller 60. Thus it will be obvious that the roller 60 advances stock material to the stock advance assembly 50 in an intermittent manner in accordance with the machine requirements.

Both the bead and the covering tape are driven in a counterclockwise direction at the wrapping station 18 by the turn-up wheel 38 and a powered drive wheel 74 when the head assembly is in the bead covering position, FIG. 4. The turn-up wheel 38 is rotatably supported on the front wall of the machine by a drive shaft 76 which shaft is connected by the usual pulley arrangement 78 to the output shaft of a single speed motor 80; see FIG. 2. A second pulley arrangement 82 connects a drive shaft 84 upon which the wheel 74 is supported for rotation therewith to the turn-up wheel drive shaft 76. The motor 80 is conventional and is supported within the machine 10. In the preferred embodiment both the turn-up wheel 38 and the drive wheel 74 are continuously driven; power being supplied to the motor upon the energization of the usual start button which button is mounted in a switch box 86 and is electrically connected to control the application of power to the motor.

The principal source of driving power for the bead is supplied by the drive roller 74. When the head assembly 20 is reciprocated to the bead covering position a drive engaging wheel 88 contacts a portion of the bead 34 and forces same against an outer peripheral surface of the driven roller 74. For this purpose the drive engaging roller is rotatably supported on the vertically extending arm 26 of the plate 21. Thus when the head assembly is reciprocated to the bead covering position the pressure roller 46 forces a portion of the bead into a deep groove in the turn-up wheel, and the drive engaging roller 84 forces the bead into drive engagement with the driven wheel 74, thus rotating the bead counterclockwise while pulling the covering material through the tape and applying it to the bead. The bead in being rotated is guided by the heretofore described guide rail 63 and by a tubular member 89 supported on the arm 26.

The turn-up wheel functions to fold the tape around three sides of the bead. The construction of this wheel as well as all other rollers will be set out below. The folding and stitching of the tape to the fourth surface of the bead is accomplished by an adjustable plow wheel assembly 90. The plow wheel assembly is supported on the arm 26 of the plate 21 and is vertically and angularly displaced in an upward direction from the drive engaging wheel 88. The plow wheels as with all wheels utilized in the covering operation are adjustable to meet the requirements of any given bead width and/or diameter.

In using the bead covering machine of this invention, operations are initiated by placing a bead onto the bead rest plate 40 and against the annular flange 42 of the turn-up wheel 44. The operator presses an operating lever of a suitable start switch 92, which switch is electropneumatically coupled to the hydraulic cylinder 33 and thereby effects the movement of the head assembly 20 from the bead rest to the bead covering position. Thereafter the entire bead covering operation including the feeding of the tape 48 is completely automatic with the operation of all parts being in timed sequence where the timing thereof is controlled by a timing mechanism 94 shown in FIG. 1 of the drawings. The timing mechanism 94 is conventionally in design and therefore will not be discussed in detail. It is a purchased unit supplied by the Eagle Signal Corp. under the trade name Cycl-Flex Reset Timer. It operates from a 110 vac 60 cycle line and includes at least one relay and a timer controlled resettable switch. The timing mechanism is essentially an adjustable setting clockwork having, in the preferred embodiment, a ten-second dial with a minimum setting of one-third second and dial divisions of one-sixth second. In operation the dial is set for a predetermined period. When current is applied to the timer the clockworks are energized. After the predetermined period expires the switch is closed and the relay is energized. The switch opens upon the de-energization of the timer. The operation of the timer 94 within the context of the electrical and pneumatic circuits of the machine will be described in greater detail with reference to FIGS. 13 and 14 below. It suffices to say at this point that it is the operation of this element in combination with the other control elements of this invention which makes this machine essentially automatic.

The timer 94 upon timing out energizes the knife assembly 52 which assembly then severs the tape 48. Thus a precise length of tape is applied to the bead 34, the length being determined by the time set on the timer. At a precise period after the cutting of the tape the head assembly 20 is reciprocated to the bead rest position and the now covered bead is automatically ejected from the machine by a kick-off plate 96.

WRAPPING, SEALING AND CUTTING
SUB-ASSEMBLIES

The sub-assemblies utilized for controlling the application of a precise amount of tape 48 to a bead 34 will be described with reference to FIGS. 5 through 12 of the drawings. Referring in particular to FIG. 5, the stock material 48 is fed by a tape advance assembly 50 to the tape pull through wheel 36. The tape advance assembly comprises a tape holding or gripping sub-assembly 98 and a tape guide sub-assembly 100 where both the tape holding and guide sub-assemblies are supported for reciprocating motion by a member 102 having angularly related legs 104 and 106. The holding and guiding sub-assemblies are supported laterally of the front surface of the wall 12 by the leg 104, and are reciprocated in an inclined vertical direction by a piston 108 rigidly connected to the leg 106 by a piston rod 110 and supported for reciprocating motion within a hydraulic cylinder 112. The leg 106 is supported for reciprocating motion within a guide assembly 114 supported on the back surface of the wall 12 by conventional means such as screws. Leg 104 extends at an angle of about 90° from the leg 106 through an inclined vertically extending notch 116 in the wall 12 of the machine. The leg 104 is provided on its facing surface, as viewed in FIG. 5, with a step or spacer member 118 for the purpose of mounting and supporting a slide bar 120 in parallel, longitudinally extending spaced apart relationship with the leg 104.

The holding assembly 98 comprises a backing or tape base plate 122 which plate is rigidly secured to a surface of the leg 104, see FIG. 6, of the motion transmitting member 102. The plate 122 may have any general configuration, and in the preferred embodiment it is substantially T-shaped; it should be wide enough to act as a stock base plate for the widest material to be utilized for covering bead bundles. A second plate member 124, which member is the preferred embodiment of the present invention is made out of spring steel and comprises two riveted together superposed members, is secured to and supported by the slide bar 120 by any conventional means, such as rivets 126 in superposed spaced relationship to the backing or stock base plate 122. The tape 48 is threaded between the plates 122 and 124, and they are supported relative to each other such that their upper edges 128 and 130 respectively pinch the tape therebetween. The slide bar 120 is provided with a pair of threaded holes 132 extending therethrough for the purpose of mounting therein a pair of set screws 134 having locking nuts 136 threaded thereon. The set screws 134 are locked to the slide bar 120 by the nuts 136 and are utilized for the purpose of placing the spring plate member 124 under compression thereby allowing flexibility in the holding power asserted by the plate 124 against the backing plate 122 and thus against the tape 48.

The tape guide assembly is supported for reciprocating motion and is mounted on the slide bar 120. It comprises a pair of vertically extending spaced apart guide bars 138 and 140 where the bars 138 and 140 are supported by the slide bar on either side of the tape 48 and bear against the stock base plate 122. Each of the guide bars is provided with a laterally extending section 142 having a cutaway portion whereby the guide bars may be mounted on the slide bar 120 and slid longitudinally therealong, see FIG. 6. In the preferred embodiment the guide bars 138 and 140 are locked in position on the slide bar 120 through the use of wing nuts 144 which nuts are threadably retained in the portion 142 of the guide bar and which frictionally engage in a trough 146 longitudinally extending of the slide bar 120. Thus it will be obvious that the distance separating the guide bars 138 and 140 may be varied by loosening the wing nuts 144 and frictionally sliding the guide bars along the slide bar 120 to thereby adapt the spacing between the said guide bars to any given width of the tape 48.

The guide bars 138 and 140 are also joined together by a third locking guide bar 148. The bar 148 is utilized for the purpose of maintaining the guide bars 138 and 140 in parallel aligned spaced apart relationship and is mounted on the guide bars are shown in FIG. 5 of the drawings. For this purpose the bar 148 may be rigidly attached to either the guide bar 138 or the bar 140 by conventional means such as a rivet or threaded member. The bar 148 is provided with a longitudinally extending slot through which a threaded member may be passed and used for mounting the guide bar to the other of the two members 138 and 140. As shown in FIG. 5 of the drawings, bar 148 is rigidly attached to the guide bar 138 with the guide bar 140 being secured to the bar 148 in fixed spaced apart relationship with the bar 138. The bar 140 can then be moved either rightwardly or leftwardly as seen in FIG. 5 of the drawings on the bar 148, and the slide bar 120 relative to the guide bar 138 and locked into such changed position by a wing nut 144 and the heretofore mentioned screw.

As will be obvious from the foregoing description, when the piston 108 and piston rod 110 are reciprocated by the controlled application of fluid in the cylinder 112, the supporting member 102 reciprocates in a vertical direction between the position shown in FIGS. 5 and 6, the retracted position, and a tape feed position. In the latter noted position the leg 104 is raised to the uppermost portion of the slot 116. When the gripping assembly is raised the plates 122 and 124 pass through the cutting assembly 52 and in particular pass between a pair of cutting surfaces or blades 150 and 152 as seen in FIG. 6. The sequence of operations wherein the tape advance assembly 50 is moved to the tape feed as opposed to the retracted position shown in FIG. 5 will be described below with reference to FIGS. 13 and 14 of the drawings.

As stated heretofore when the plate or head assembly 20 is in the bead rest position the bead 34 is positioned relative to the tape pull through wheel 36 and the turn-up wheel 38 by the bead rest plate 40 and the hold-down wheel 44 which wheel is rotatably mounted on the vertically extending leg 22 of the plate 21. The hold-down wheel is shown in detail in FIG. 7 of the drawings and comprises a female section or roller 154 and a male section or roller 156 mounted for rotation on a cylindrical roller 158 which roller is rotatably supported on a shaft 160. The shaft 160 is rigidly supported on one end within a longitudinally extending slot 162 in the arm 22 of the plate 21. The shaft may be supported at any position in the slot by conventional means such as the nuts 164 threadably mounted on the shaft on either side of the arm 22. In this manner the hold-down wheel may be vertically adjusted on the arm 22 and therefore can accommodate beads of different diameters.

A multi-roller hold-down wheel is utilized, for the purpose of accommodating the roller to the beads of different widths. To this end the female roller 154 is provided with a centrally disposed annular cavity wherein the male roller 156 is press fitted. The roller 154 is locked to a positioning collar or hub 166 by conventional means such as a set screw 168 and the collar is in a like manner fixedly mounted on the cylindrical roller 158 by a second positioning collar or hub 170; the latter element being fixed to the roller 158 by a set screw. The entire wheel assembly may be locked on to the shaft by an end collar 172.

As has been stated heretofore, the hold-down wheel 44 is provided with an annular flange 42 which flange is a radially extending part of the female roller 154. The annular flange 42 is utilized for the purpose of positioning a bead relative to the turn-up and tape pull through wheels while the head assembly 20 is in the bead rest position. The male roller 156 is provided with a sloped or bevelled annular flange 174 which flange serves the purpose of forming a shallow groove 176 between the two rollers of the hold-down wheel. The sloped flange 174 acts to guide a bead 34 into the groove when the hold-down wheel is lowered to the bead covering position by the vertical reciprocation of the head assembly. As is obvious from the foregoing description, the hold-down wheel 44 is easily adaptable to beads of varying widths in that the width of the groove 176 may be easily changed by changing the relative positions of the rollers 154 and 156 by simply unlocking the hub 170 and axially changing the relative position of the male roller 156.

When the hold-down wheel is moved into the bead covering position it urges a portion of the bead 34 into contact with the tape 48 on top of the tape pull through wheel 36. The tape pull through wheel is supported vertically above and slightly laterally displaced from the tape advance assembly 50; see FIGS. 3, 4 and 5. It is also laterally displaced from the periphery of the turn-up wheel to provide sufficient space therebetween for the pressure roller 46. The pull through wheel is rotatably supported on a shaft 178 which shaft comprises a laterally extending part of a mounting bracket 180. The mounting bracket is supported by a mounting screw 182 extending through a slot 184 in the bracket 180, said screw being threadably received in the wall to thereby support the bracket. The shaft 180 extends laterally of the wall. The slot 184 is provided to allow vertical adjustment of the tape pull through wheel. The wheel 36 is positioned on the shaft 178 by a pair of collars 186 relative to the bead and tape. In the preferred embodiment of this invention the wheel 36 is made out of a low friction material such as Teflon, registered trademark, in order that the tape 48 may be pulled easily over its surface.

The turn-up wheel 38 is shown in detail in FIG. 8 and as has been stated is utilized for wrapping the covering material 48 around three sides of the bead 34. In the preferrd embodiment of this invention, the turn-up wheel is multi-sectional and includes a female roller or section 188 and a male roller or section 190 where the male section is press fitted into a centrally disposed annular cavity 192 in the female section. Each section 188 and 190 is provided with a radially extending flange having a sloping inside face 194 such that when the sections are locked together a deep substantially rectangular shaped in cross section, annular groove 196 is formed between the two sections. As is conventional, the bead 34 and tape 48 are, during the wrapping operation, forced into the turn-up wheel in order that the covering material may be wrapped around three sides of the bead. The bevelled or sloped flanges 194 greatly facilitate the entry of the stock material into the groove 196. Since the groove 196 conforms in shape to the bead 34 the efficiency of the wheel in applying tape to the bead is also greatly facilitated. Thus the combination of a deep groove or recess and the sloped or bevelled flanges 194 greatly aid the wrapping of the material 48 around the three sides of the bead.

Each of the sections or rollers 188 and 190 is provided with a key 198 for mounting the wheel 38 on the drive shaft 76 by inserting the keys in a keyway 200 on the shaft. The sections 188 and 190 are also locked together in an axial displacement relative to each other by conventional means such as set screws 202 and 204 respectively. It should therefore be obvious that by loosening the set screws the groove 196 may be made axially wider or smaller for the purpose of accommodating the turn-up wheel to beads of various widths. A locking collar 206 may be mounted on the front end of the shaft 76 by conventional means such as a set screw.

As may be best seen in FIG. 4 of the drawings, the partially wrapped bead enters the plow wheel assembly 90 after the turn-up operation. This assembly includes a pair of spaced apart flanged or stepped roller members 208 and 210 as may be best seen in FIGS. 9 and 10 of the drawings. The rollers 208 and 210 are provided with annular flanges or step portions 212 and 214 respectively, which portions engage vertically extending unwrapped portions 216 of the covering material, see FIGS. 8 and 10. The rollers serve the dual function of folding and stitching the unwrapped portions 216 of the tape to the top of the surface of the bead 34. As shown in FIG. 10 of the drawings, the roller 208 is spaced apart from the roller 210 and in advance thereof, or that is, closer to the turn-up wheel. Thus the flange or step portion 212 of the roller 208 engages the right-hand vertical section 216 of the material 48 and folds it over the top of the bead 34. In a like manner the larger stepped or flanged portion of the wheel 210 engages the left-hand portion 216 of the material 48 and folds that over and stitches it to the top of the material that was folded over by the roller 208.

Each of the rollers 208 and 210 are rotatably supported by a holding assembly as shown in FIG. 9 of the drawings, which assembly allows for vertical and lateral adjustment of the rollers in order that they may accommodate beads of varying widths and diameter. The rollers 208 and 210 are rotatably supported in fixed spaced apart relationship by a pair of screws 218 and 220 respectively. The screws are mounted in and threadably supported by a pair of nuts 222 and 224 respectively. Each of the screws may be vertically displaced independently of each other within the respective nuts 222 and 224 to thereby allow vertical adjustment of the respective rollers. In this manner beads of various diameters may be accommodated by the machine. In addition, each of the nuts is provided with a longitudinally extending slot and a pair of laterally extending flanges 226 positioned on each side of the slot, which flanges are perforated with threaded holes for receiving locking screws 228. Through the use of the perforated flanges and the locking screws, the rollers 208 and 210 may be securely locked into any vertical position relative to a bead and wrapping material.

Each of the nuts 222 and 224 is also provided with a laterally extending stud 229 which stud is frictionally received within a mating holding cylinder 230 of a mounting plate 232; the studs being slidable therein. The mounting plate 232 is rigidly supported by the vertically extending arm 26 of the movable plate 21 as shown in FIGS. 3 and 4 of the drawings. The holding cylinders 230 like the nuts 222 and 224 are each provided with vertically extending perforated flanges 234 where the holes therein are threaded to receive locking screws such as the locking screw 236. It will thus be obvious that each of the rollers 208 and 210 and their supporting structures constituted by the nuts 222 and 224 and screws 218 and 220 may be laterally displaced by loosening the locking screw 236 and sliding the stud within the appropriate holder 230. Thus the wheels 208 and 210 may be adapted to handle beads of any width.

As has been mentioned heretofore, the bead 34 is rotatably driven by a powered wheel 74 which wheel is shown in detail in FIG. 11 of the drawings. It comprises a hub portion 238 which portion is keyed to the drive shaft 84 by a key 240 set in a corresponding keyway 242 in the drive shaft. The drive wheel may be locked to the shaft by conventional means such as a set screw 244. The hub portion of the drive wheel 74 is connected to an annular peripheral bead engaging or driving surface 246 by an annular web 248. The bead engaging surface 246 may be provided with a set screw access hole such as the hole 250 in order that the set screw may be loosened so that the wheel may be removed from the drive shaft. As mentioned heretofore, power for the drive wheel is supplied by the motor 80.

When the plate assembly 20 with the driving and wrapping assemblies mounted thereon is maintained in the bead rest position, the wheel 74 is constantly turning; however, the bead 34 does not engage the surface 246 of the drive wheel and thus is not rotated. When the plate 21 is shifted to the bead covering position the drive engaging wheel 88 engages the outer surface of the bead and urges it into contact with the driving surface 246 of the wheel 74, thus imparting drive motion to the bead causing it to be rotated in the counterclockwise direction.

As is best seen in FIG. 11 of the drawings, the drive engaging wheel 88 includes a cylindrical hub 252 having affixed thereto an outer bead engaging surface 254, which surface may be made out of any resilient material such as rubber. By using a drive engaging wheel having a resilient bead engaging surface, the least possible damage is done to the covering material and bead during the wrapping of the bead 34. The hub is mounted on for rotation with a cylindrical roller 256 which roller is rotatably supported on a shaft 258 and locked thereto by a collar 260. The collar 260 is rigidly attached to the shaft 258 by a set screw 262. The shaft 258 is locked onto and supported by the arm 26 of the plate 21 within a slot 264 which slot extends longitudinally in the direction of the arm 26. Thus the drive engaging wheel 88 may be adjusted in the vertical direction as viewed in FIG. 11 to thereby allow for beads having different diameters. Beads having different widths may be handled by constructing the bead engaging surfaces of the wheels 74 and 88 long enough to accommodate the widest possible bead to be covered by the machine.

As has been stated, the entire wrapping operation of the bead covering machine of this invention is automatic. The operation takes place at a constant speed and the time of operation is set according to the size of the bead to be wrapped. After the predetermined time period is over, a cutting assembly shown in FIGS. 5, 6 and 10 of the drawings automatically severs the covering material 48 and thus cuts a length of covering material appropriate to cover the bead 34 without wastage; the length of tape used is determined by the timed setting. Referring now to FIGS. 5, 6 and 10, the cutting assembly 52 includes a pair of knives 266 and 268 having cutting surfaces or blades 150 and 152 respectively extending therealong or secured thereto, the cutting surfaces extend across the tape 48 where the tape is threaded therebetween by the tape advance assembly 50 and the pull through roller 36.

The blade 150 is rigidly supported on a surface of the knife 266 by conventional means such as screws and is retained there in a fixed position relative to the blade 152. For this purpose the knife 266 is provided with a laterally extending cylindrical shank 270 having a plurality of annular surfaces 272, 274 and 276 thereon as is best seen in FIG. 5 of the drawings. The knife 266 is supported by its shank 270 on the right end as viewed in FIG. 5 by being keyed to a mounting block 278 which mounting block abuts on the partition wall 14 and is held thereto by a locking screw 280 threadably supported on the shank. The annular surfaces 272 and 276 are utilized for the purpose of supporting a pair of spaced apart bushings 282 and 284.

The knife 268 is a moving knife of cylindrical shape rotatably mounted on the bushings 282 and 284 concentric with and supported by the shank 270 of the knife 266. Additional support for the cutting knives 266 and 268 is provided by a flanged bearing 286 mounted in and supported by the front wall 12 of the machine by conventional means; the knife 268 being rotatably supported by the bearing 286. The knife 268 is supported within, on its right end as viewed in FIG. 5, a knife actuator block 288 for rotation with same. To this end the knife is provided with a key slot and a pair of recesses for receiving a key 290 which key is supported on the knife actuator 288 and retained thereon by screws 292 received in said recesses; said key being positioned in said key slot. The knife actuator block is rotatably supported by the shank of the knife 266 on a pair of bearings 294 and is provided with a vertically extending tongue 296 which tongue may be pinned by conventional means to a piston rod connected to a piston; the latter named element being mounted in a hydraulic cylinder 298 for reciprocation therein.

As is evident from the foregoing description, when the piston is actuated to the left as viewed in FIG. 6 of the drawings, the piston rod will move the knife actuator block 288 and thus the knife 268 in a counterclockwise direction by rotating the tongue 296 in a counterclockwise direction. In that the tape 48 is threaded between the cutting blades 150 and 152, when the knife 268 and its blade 152 are rotated, the tape 48 is pressed against the blade 150 thereby causing the tape to be severed transversely therealong. As is evident from FIG. 10 of the drawings, the cutting surface 150 is inclined in order that the tape may be sheared with a clean cut.

For reasons of safety a knife guard comprising a plate 300 is secured to the shaft 178 of the tape pull through wheel mounting bracket 180 by conventional means such as a set screw. The plate 300 extends across and in front of the cutting blades 150 and 152 so as to maintain a shield between said blades and the machine operator.

Referring now to FIG. 8, once the cutting assembly has severed the tape 48 and allowing for a due time delay so that the severed cover material is wrapped around the bead 34, the bead plate or head assembly 20 returns to the bead rest position thereby removing the pressure roller 46, hold-down wheel 44, plow wheel assembly 90 and drive engaging roller 88 from contact with the head. The bead's natural resiliency will cause the bead to partially snap out of engagement with the turn-up wheel 38 and in addition it will be raised by the bead rest plate 40 as the rest plate is moved back to the bead rest position by the head assembly 20. In this interval and in timed sequence with the movements heretofore described, the bead kick-off plate 96 is energized to move leftwardly as viewed in FIG. 8 to kick the now covered bead off the machine. The plate 96 has rigidly mounted therein a suitable kick-off rod 302 which rod is connected to the piston rod of a reciprocating piston mounted for such motion within a hydraulic cylinder 304. In the preferred embodiment, a guide rod 306 is rigidly mounted, such as by threads, to the plate 96 and reciprocates with the movement of the plate 96. For this purpose the guide rod is mounted for movement in a hole 308 in the front wall 12 of the machine 10.

OPERATION OF THE MACHINE

The operation of the automatic bead covering machine will be described with reference to FIGS. 1, 3, 4, 13 and 14 of the drawings. Referring now to FIG. 14 of the drawings, the motors 70 and 80 are connected to a conventional power source through a conventional ganged switch and a plurality of relay contacts 322a and 316a respectively. Power is applied to an electrical control circuit through a conventional step down transformer, the secondary of which is connected to a pair of busses or bus bars 310 and 312. As referred to heretofore, the turn-up wheel 38 and the powered drive wheel 74 are continuously rotated by and through a drive system including the motor 80 once the machine is set into operation. Accordingly, when the machine operator presses a start button 314 mounted in the switch box 86, a circuit is completed from the bus 310 to the bus 312 through a motor relay 316 and conventional motor overload contacts. The relay contacts 316a are thereby energized causing power to be applied to the motor 80 to thereby cause the turning of the wheels 38 and 74. A holding circuit is established around the start switch 314 by the normally open contacts 316b which contacts closed with the energization of the motor relay 316. Motor 80 runs continuously but may be stopped by breaking the circuit to relay 316 by opening a stop button 318.

At the start of operations, a toggle switch 320 is closed to thereby condition a circuit for the motor 70 for energization. The circuit includes the now closed contacts 316b, the toggle switch 320, a motor relay coil 322, motor overload contacts, and the photocell 68. The circuit is connected across the busses 310 and 312. The relay 322 is normally in an open circuit due to the photocell 68 and is only energized when light from the source 66 impinges on the photocell. Accordingly the motor 70 is energized only when the circuit to its start relay 322 is completed, thus causing the relay to close its contacts 322a. This occurs whenever the loop of tape interrupting the light beam from the source 66 becomes so small as to allow the light to impinge on the photocell 68.

In order to initiate a bead wrap operation, the bead as heretofore stated is placed on the bead rest plate 40 and positioned against the flange 42 of the hold-down wheel 44. The operator trips the switch 92 which switch is electrically connected on one side to the bus 310; see FIG. 14. By closing this switch a circuit is completed through a pair of normally closed contacts 360c and a relay 324 to the opposite bus 312, thus causing the relay 324 to become energized. Relay 324 closes its normally open contacts 324a to complete a holding circuit around the switch 92. In addition the normally open contacts 324b of the relay 324 are closed, thereby causing a circuit to be completed from the bus 310 through a pair of solenoid valve operators 326 and 328 to the bus 312.

The solenoid valve operators 326 and 328 are operators for a pair of solenoid valves 330 and 332 respectively and when energized connect the hydraulic cylinders 33 and 112 to a hydraulic fluid supply line 334 over a plurality of feed-exhaust lines 336 and 338 for the cylinder 33 and 340 and 342 for the cylinder 112. Each of the cylinder feed and exhaust lines may be provided with check valves. The hydraulic feed systems and solenoid valves are all identical; thus the operation of one will suffice to explain all. When the operator 326 is energized the solenoid valve is operated to connect the feed line 336 to the hydraulic fluid supply line 334. Hydraulic fluid is thus supplied to the cylinder 33, causing the piston 30 to be reciprocated within the cylinder and thus causing the head assembly 20 to be lowered to the bead covering position. The line 338 is connected by the valve 330 to a fluid exhaust or exhaust system 344 which if air is the fluid used may be the atmosphere. At the same time the same operation occurred for the cylinder 112 causing the stock advance assembly 50 to be withdrawn from the tape feed position to its retracted position.

When the plate 21 is in the bead covering position, it closes a limit switch 346 to thereby complete a circuit from the bus 310 through a pair of normally closed contacts 360b and the timer 94 to the opposite bus 312. The timer 94 as previously stated is operated electrically only after a predetermined period as set on its dial and then energizes a self-contained relay 348. During this interval, i.e., prior to the energization of the relay 348 the bead is automatically being wrapped with the covering material. After the timer 94 times out, its relay 348 is energized thereby closing its contacts 348a to complete a circuit from the bus 310 through a pair of normally closed contacts 360d, the normally opened now closed timer contacts 348a and a solenoid valve operator 350 to the opposite bus 312. With the operation of the valve operator 350, a solenoid valve 352 is energized to apply fluid from the supply line 334 through a feed line 354 to the cylinder 298. With the application of fluid to the cylinder 298 the moving knife 268 of the cutting assembly 52 is rotated by the reciprocation of its actuator piston, thereby causing the tape 48 to be severed as previously explained. Fluid is exhausted from the cylinder through a line 356.

When the knife has completed its rotational movement it operates a limit switch 358 which switch causes a circuit to be completed from the bus 310, through a pair of normally closed contacts 364a, the limit switch 358 and a conventional time delay relay 360 to the opposite bus 312. After a given interval of time as determined by the time delay relay it energizes and operates its contacts 360a through 360e. The closing of normally open contacts 360a completes a holding circuit for the relay 360 around the limit switch 358 thus maintaining the relay 360 energized.

With the energization of the relay 360a its normally closed now open contacts 360c break the circuit to the relay 324 thereby causing its contacts 324a and 324b to reverse, thus breaking the holding circuit around the now open switch 92 and breaking the circuit to the solenoid valve operators 326 and 328. The solenoid valves 330 and 332 are of the spring return type, as are all of the solenoid valves used in the preferred embodiment; consequently the lines 336 and 340 are disconnected from the hydraulic supply line and are connected to the exhausts 344. The former exhaust lines 338 and 342 are now connected to the supply line 334; thus hydraulic fluid is now supplied to the other side of the respective cylinders 33 and 112, causing the head assembly to be reciprocated to the bead rest position and the tape feed assembly to be reciprocated to the tape feed position.

As the foregoing events are occurring, the normally closed contacts 360b and 360d of the relay opened, thus causing the de-energization of the timer 94 and the solenoid valve operator 350. With de-energization of the operator 350 its corresponding valve 352 returns to reverse the lines 354 and 356, thereby causing the moving knife 268 to be returned to its original position. Limit switch 358 is thus opened.

When the head assembly reaches the bead rest position, it trips a limit switch 362 thereby completing a circuit from bus 310 through the normally open now closed contacts 360e, the switch 362, a second time delay relay 364 and a solenoid valve operator 366, connected in parallel to the relay 364 to the bus 312.

With the operator 366 energized its corresponding valve 368 reverses thereby connecting the cylinder 304 to the supply line 334 over a feed line 370. An exhaust line 372 is connected to the exhaust system 334. The piston within the cylinder 304 is reciprocated causing the bead ejector or kick off plate 96 to eject the now covered bead from the machine.

After a predetermined period the delay relay 364 energizes, causing its contacts 364a to open, thus breaking the circuit to the relay 360. The relay 360 is thereby de-energized and all of its contacts, including the contacts 360e in series with the relay 364 and solenoid valve operator 366 reverse themselves. The solenoid valve 368 returns, thus reversing the lines 370 and 372. Hydraulic fluid is not supplied to the other side of the cylinder 304 causing the bead kick off plate 96 to be retracted.

The machine was recycled with the energization of the relay 360 and the consequential breaking of its contacts 360d causing the timer 94 to reset.

Although a specific embodiment of the invention has been described it is within the spirit and scope of the invention to modify it by or to include all of its equivalents. Thus it is recognized that modifications may be made to the various described sub-assemblies. For example, electronic equivalents may be utilized instead of the electrical switches and relays described.

I claim:
1. A machine for automatically covering a bead bundle with a length of tape covering material comprising:
  means for supplying covering material to said bead bundle, said supply means including a signal responsive apparatus for advancing said covering material and including means for sensing and replenishing the immediately available supply of said material;
  an adjustable rotatably mounted turn-up wheel having spaced apart angular peripheral flanges between which a portion of said bead may be forced in the wrapping thereof;
  means supported by said machine and operatively connected to said turn-up wheel for continuously driving same;
  means mounted for movement between bead rest and bead covering positions adjacent to said turn-up wheel for engaging said bead with said covering material and for wrapping and sealing said covering material about said bead, the said means comprising an assembly having mounted thereon for movement therewith a means for positioning and supporting a bead wire bundle relative to said turn-up wheel when said assembly is in said bead rest position, means rotatably mounted on said plate assembly for forcing a portion of said bead between the flanges of said turn-up wheel and for forcing a second portion of said bead into engagement with said means for supplying said covering material to said bead, and roller means mounted in close proximity to said turn-up wheel and engaging said bead when said assembly is in said bead covering position for wrapping, sealing and rotatably driving said bead;

electrically responsive power means operatively connected to said bead engaging, wrapping, and sealing means for moving same between said bead rest and covering positions;

a powered wheel for rotatably driving said bead when said bead engaging means is in said bead covering position;

adjustable timing means for automatically returning said bead engaging, covering and sealing means from said bead covering position to said bead rest position after a predetermined period;

a covering material cutting assembly operatively connected to and energized by said timing means after said predetermined period; and means mounted in proximity to said turn-up wheel and automatically responsive to the movement of said bead engaging, wrapping and sealing means from said bead covering to said bead rest position for ejecting said bead from said machine.

2. A machine in accordance with claim 1 wherein said means for positioning said bead when said assembly is in said bead rest position comprising a plate member having a portion thereof extending at right angles to said assembly and supported immediately above and adjacent to said turn-up wheel; and a multisection hold-down roller comprising a first section having an annular flange adjustably mounted on said assembly, and a second section having an annular bevelled bead guiding surface thereon adjustably mounted on said assembly, said hold-down roller being adapted to guide said bead in the alignment thereof relative to said turn-up wheel when said assembly is in said bead rest position and adapted to urge said bead against said covering material supply means when said assembly is in said bead covering position.

3. A machine according to claim 1 wherein said roller means comprises a pair of spaced adjustably mounted plow wheels adapted to engage said bead after said bead is rotated through said turn-up wheel to turn said covering material over a surface of said bead and to seal same thereon; and a drive engaging wheel adapted to engage a portion of said bead and force same against said powered wheel to thereby rotatably drive said bead.

4. A machine according to claim 3 wherein said plow wheels are threadably mounted on said plate assembly and have stepped rollers rotatably supported on said adjustable plow wheel mounting, said step rollers being adapted to engage said covering material to fold and switch said covering material to a surface of said bead.

5. A machine according to claim 3 wherein said drive engaging wheel is provided with a resilient surface.

6. a machine for automatically covering a bead bundle with a length of tape covering material comprising:

an adjustable rotatably mounted turn-up wheel having spaced apart angular peripheral flanges between which a portion of said bead may be forced in the wrapping thereof;

means supported by said machine and operatively connected to said turn-up wheel for continuously driving same;

means mounted for movement between bead rest and bead covering positions adjacent to said turn-up wheel for engaging said bead with said covering material, and for wrapping and sealing said covering material about said bead;

electrically responsive power means operatively connected to said bead engaging, wrapping and sealing means for moving same between said bead rest and covering positions;

means for supplying covering material to said bead and to said bead engaging, wrapping and sealing means, said supply means including a covering material pull through wheel rotatably supported adjacent to said turn-up wheel, and signal responsive apparatus for advancing covering material and for sensing and replenishing the immediately available supply of said material, the signal responsive apparatus including pneumatic apparatus mounted for reciprocating motion on said machine, covering material holding means supported for reciprocal movement by said pneumatic apparatus and adapted to supply covering material to said pull through wheel when moved to a feeding position, and electrical control means for reciprocating said pneumatic apparatus to lower said holding means from said feed position, said electrical means being energized by said bead engaging, wrapping and sealing means when said last named means is moved to a bead covering position;

a powered wheel for rotatably driving said bead when said bead engaging means is in said bead covering position;

adjustable timing means for automatically returning said bead engaging, covering and sealing means from said bead covering position to said bead rest position after a predetermined period;

a covering material cutting assembly operatively connected to and energized by said timing means after said predetermined period; and means mounted in proximity to said turn-up wheel and automatically responsive to the movement of said bead engaging, wrapping and sealing means from said bead covering to said bead rest position for ejecting said bead from said machine.

7. Apparatus according to claim 6 wherein said electrical control means includes a limit switch adapted to be operated by said bead engaging, wrapping and sealing means when said means is in said bead covering position, and a solenoid valve operatively connected to said limit switch and adapted to provide pneumatic fluid to said pneumatic apparatus when said solenoid valve is operated by said limit switch.

8. A machine for automatically covering a bead bundle with a length of tape covering material comprising:

an adjustable rotatably mounted turn-up wheel having spaced apart angular peripheral flanges between which a portion of said bead may be forced in the wrapping thereof;

means supported by said machine and operatively connected to said turn-up wheel for continuously driving same;

means mounted for movement between bead rest and bead covering posiitons adjacent to said turn-up wheel for engaging said bead with said covering material, and for wrapping and sealing said covering material about said bead;

electrically responsive power means operatively connected to said bead engaging, wrapping, and sealing means for moving same between said bead rest and covering positions;

means for supplying covering material to said bead and to said bead engaging, wrapping and sealing means, said supply means including signal responsive apparatus for advancing said covering material and including means for sensing and replenishing the immediately available supply of said material;

a powered wheel for rotatably driving said bead when said bead engaging means is in said bead covering position;

adjustable timing means for automatically returning said bead engaging, covering and sealing means from said bead covering position to said bead rest position after a predetermined period;

a covering material cutting assembly operatively connected to and energized by said tming means after said predetermined period;

said cutting assembly including a stationary knife rigidly supported by said bead covering machine and having a cutting edge thereon extending transversely of said covering material, a second knife having a cylindrical shank mounted for rotary movement concentric with said stationary knife, said second knife being provided with a cutting edge extending transversely of said covering material, and electropneumatic means operatively connected to the shank of said second knife for turning same; and means mounted in proximity to said turn-up wheel and automatically responsive to the movement of said bead engaging, wrapping and sealing means from said bead covering to said bead rest position for ejecting said bead from said machine.

9. A cutting assembly according to claim 8 wherein said pneumatic means includes a knife actuator block keyed to said shank of said second knife, and a piston mounted for reciprocating motion within a hydraulic cylinder, said piston being coupled to said actuator block.

10. An automatic cutting apparatus for an automatic bead bundle covering machine for severing a predetermined length of covering tape comprising:

a knife assembly including a stationary knife rigidly supported by said machine and having a cutting edge extending transversely of said tape, and a second knife supported for rotary movement by said stationary knife and concentrically of said stationary knife, said second knife being provided with a cutting edge extending transversely of said tape; and electropneumatic means including a knife actuator rotatably mounted on said stationary knife and operatively connected to said second knife, and an electrically operated powered piston operatively connected to said knife actuator; the electropneumatic means being effective upon energization to move the cutting edge of said second knife relative to said first knife to thereby sever said covering tape.

11. An automatic covering tape advance assembly for an automatic bead bundle wrapping machine comprising:

support means including an electrically responsive pneumatic power means mounted on said machine for reciprocating motion between a retracted position and a tape to bead bundle covering position; and tape advance means including an adjustable tape guide assembly and a tape gripping assembly mounted on said support means for movement therewith, the said tape advance means being effective to advance covering tape to bead covering rolls on said machine when said support means is at said bead bundle covering position, the tape gripping assembly of said tape advance means comprising a base plate of generally T-configuration rigidly mounted on said support means and a resilient tape holding plate adjustably mounted on said support means in spaced apart relation to said base plate.

12. A covering tape advance assembly according to claim 11 wherein said tape guide assembly comprises:

a pair of spaced guide bars adjustably mounted on said supporting means relative to said gripping assembly such that said covering tape is positioned between said guide bars; and a locking guide bar having a longitudinally extending slot mounted on said spaced guide bars transversely thereof, at least one of said spaced guide bars being mounted on said locking guide bar by a threaded member passed through said slot.

13. A head assembly for an automatic bead bundle covering machine adapted to automatically engage said bead with a rotating drive power means and to engage said bead with bead covering material and to cover said bead with said material comprising:

a first plate member adapted to be reciprocated within a guide assembly, said plate member being operatively connected to a signal responsive hydraulically powered piston, said plate member being provided with a plurality of longitudinally extending leg members;

a first roller member rotatably mounted on a first leg of said plurality of legs;

a second plate member supported by a second leg of said plurality of legs, said second plate member extending transversely of said second leg, and a second roller rotatably supported on said second leg, said second roller being vertically displaced from said second plate member;

a bead guide member mounted on a third leg of said plurality of legs, a drive engaging member rotatably supported on said third leg, said drive engaging member being vertically displaced from said guide member, and a pair of adjustable plow wheels supported on said third leg and vertically and angularly displaced from said drive engaging roller on said third leg.

14. A machine for automatically wrapping a bead wire bundle with a length of tape comprising:

a rotatably mounted turn-up wheel having spaced apart angular peripheral flanges between which a portion of said bead wire bundle may be forced into the wrapping thereof;

an electrical motor operatively connected to said turn-up wheel for continuously driving same;

a plate assembly mounted for movement between bead rest and bead covering positions, said plate assembly being provided with a bead rest for positioning said bead relative to said turn-up wheel when said plate assembly is in said bead rest position;

electropneumatic means for moving said plate assembly between said bead rest and bead covering positions;

a tape pulled through wheel, said wheel being rotatably mounted adjacent to the periphery of said turn-up wheel;

a tape advance assembly operable between tape feed and retracted positions, said assembly being mounted in close proximity to said tape pull throw wheel when said assembly is in said tape feed position such that said tape frictionally engages said wheel;

means for supplying tape to said tape advance assembly, said means comprising a tape supply roll, a drive wheel engaging said tape such that a loop of tape is formed between said drive wheel and said tape advance assembly, and photoelectric means for sensing said loop, said photoelectric means being operatively connected to said drive wheel to drive same whenever said loop is not sensed by said photoelectric means;

a powered bead drive wheel;

bead driving and wrapping means comprising a pressure roller mounted on said plate assembly and located adjacent to said turn-up wheel when said plate assembly is in said bead covering position such that a portion of said bead is forced onto a portion of the periphery of said tape pull through wheel to engage said tape and a second portion of said bead is forced between the flanges of said turn-up wheel, an adjustable hold-down roller mounted on said plate assembly and engaging a portion of said bead when said plate assembly is in said bead covering position, a pair of adjustable spaced apart plow wheels mounted on said plate assembly adjacent to said turn-up wheel when said plate assembly is in said bead covering position, said plow wheel engaging said tape and said bead, and a drive engaging wheel rotatably mounted on said plate assembly, said drive engaging wheel being located by said plate assembly when said assembly is in said bead covering position so as to frictionally engage said bead with said powered bead drive wheel;

electropneumatic means for moving said tape advance assembly to said retracted position, said means being energized by said plate assembly when said assembly moves to its bead covering position;

adjustable timing means for cycling said machine to operate for a given predetermined period;

a tape cutting assembly mounted adjacent to said tape advance assembly, said tape cutting assembly being operatively connected to said timing means and energized by said timing means after said predetermined period;

electropneumatic means operatively connected to said tape cutting assembly for restoring said plate assembly to said bead rest position for moving said tape advance assembly from said retracted position to said feed position and for resetting said timing means;

means mounted adjacent to the periphery of said turn-up wheel for ejecting said bead; and means for energizing said ejection means, said means being operable for a predetermined period and operated by said plate assembly when said assembly is moving to said bead rest position.

References Cited

UNITED STATES PATENTS

| | | | |
|---|---|---|---|
| 1,871,119 | 8/1932 | Denmire | 156—460 XR |
| 2,231,853 | 2/1941 | MacDonald et al. | 156—353 |
| 2,278,533 | 4/1942 | Desautels | 156—422 XR |
| 2,311,600 | 2/1943 | Shook | 156—353 |
| 2,855,976 | 10/1958 | Jeannero et al. | 156—460 |
| 3,017,312 | 1/1962 | Kraft | 156—378 XR |
| 3,291,674 | 12/1966 | Worrall et al. | 156—353 |
| 3,330,491 | 7/1967 | Williams | 156—422 XR |

BENJAMIN A. BORCHELT, Primary Examiner

S. C. BENTLEY, Assistant Examiner

U.S. Cl. X.R.

156—460

PO-1050
(5/69)

UNITED STATES PATENT OFFICE
CERTIFICATE OF CORRECTION

Patent No. 3,532,578           Dated October 6, 1970

Inventor(s) L. D. Chronister

It is certified that error appears in the above-identified patent and that said Letters Patent are hereby corrected as shown below:

Column 1, line 54, the word "cloth" should read -- cover --.
Column 6, line 30, the word "conventionally" should read
-- conventional --. Column 7, line 21, the word "as" should
read -- in--; line 63, the word "are" should read -- is --.
Column 12, line 6, the word "head" should read -- bead --.
Column 14, line 29, the word "not" should read -- now --.
Column 15, line 49, the word "switch" should read -- stitch --.
Column 16, line 69, the word "tming" should read -- timing --.

SIGNED AND
SEALED
JAN 26 1971

(SEAL)
Attest:

Edward M. Fletcher, Jr.
Attesting Officer

WILLIAM E. SCHUYLER, JR.
Commissioner of Patents